US009497198B2

(12) United States Patent
Mullick et al.

(10) Patent No.: US 9,497,198 B2
(45) Date of Patent: *Nov. 15, 2016

(54) SYSTEMS AND METHODS FOR APPLICATION BASED INTERCEPTION OF SSL/VPN TRAFFIC

(71) Applicant: Citrix Systems, Inc., Fort Lauderdale, FL (US)

(72) Inventors: Amarnath Mullick, Bangalore (IN); Charu Venkatraman, Bangalore (IN); Junxiao He, Saratoga, CA (US); Shashi Nanjundaswamy, Bangalore (IN); James Harris, San Jose, CA (US); Ajay Soni, San Jose, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/498,816

(22) Filed: Sep. 26, 2014

(65) Prior Publication Data
US 2015/0020220 A1 Jan. 15, 2015

Related U.S. Application Data

(63) Continuation of application No. 11/462,329, filed on Aug. 3, 2006, now Pat. No. 8,869,262.

(51) Int. Cl.
*G06F 15/16* (2006.01)
*H04L 29/06* (2006.01)

(52) U.S. Cl.
CPC ........... *H04L 63/10* (2013.01); *H04L 63/0272* (2013.01); *H04L 63/0876* (2013.01); *H04L 63/102* (2013.01); *H04L 63/20* (2013.01)

(58) Field of Classification Search
None
See application file for complete search history.

(56) References Cited

U.S. PATENT DOCUMENTS

| 5,867,494 A | 2/1999 | Krishnaswamy et al. |
| 5,987,611 A | 11/1999 | Freund |

(Continued)

FOREIGN PATENT DOCUMENTS

| EP | 1 418 730 | 5/2004 |
| EP | 1 641 215 | 3/2006 |

(Continued)

OTHER PUBLICATIONS

Advisory Action for U.S. Appl. No. 11/462,329 dated Nov. 16, 2009.
Chinese Office Action on 200780037175.8 dated Oct. 22, 2012.
Chinese Office Action on 200780037175.8 dated Feb. 16, 2012.
Examiner's First Report for AU App. No. 2007281166 dated Nov. 24, 2010.
Final Office Action dated Jun. 9, 2010 for U.S. Appl. No. 11/462,329.

(Continued)

*Primary Examiner* — Natisha Cox
(74) *Attorney, Agent, or Firm* — Foley & Lardner LLP; Christopher J. McKenna; Paul M. H. Pua

(57) ABSTRACT

A method for allowing or denying, by an appliance, access to a resource by an application on a client via a virtual private network connection includes basing the decision to allow or deny access on identification of the application. The appliance intercepts a request from an application on a client on a first network to access via a virtual private network connection a resource on a second network. The appliance identifies the application and associates with the intercepted request an authorization policy based on the identity of the application. The appliance determines, using the authorization policy and the identity of the application, to either allow or deny access by the application to the resource.

20 Claims, 10 Drawing Sheets

(56) References Cited

U.S. PATENT DOCUMENTS

| | | | |
|---|---|---|---|
| 5,999,525 A | 12/1999 | Krishnaswamy et al. | |
| 6,219,669 B1 | 4/2001 | Haff et al. | |
| 6,335,927 B1 | 1/2002 | Elliott et al. | |
| 6,442,571 B1 | 8/2002 | Haff et al. | |
| 6,452,915 B1 | 9/2002 | Jorgensen | |
| 6,473,794 B1 | 10/2002 | Guheen et al. | |
| 6,519,571 B1 | 2/2003 | Guheen et al. | |
| 6,523,027 B1 | 2/2003 | Underwood | |
| 6,536,037 B1 | 3/2003 | Guheen et al. | |
| 6,601,233 B1 | 7/2003 | Underwood | |
| 6,609,128 B1 | 8/2003 | Underwood | |
| 6,615,166 B1 | 9/2003 | Guheen et al. | |
| 6,633,878 B1 | 10/2003 | Underwood | |
| 6,640,248 B1 | 10/2003 | Jorgensen | |
| 6,704,873 B1 | 3/2004 | Underwood | |
| 6,718,535 B1 | 4/2004 | Underwood | |
| 6,721,713 B1 | 4/2004 | Guheen et al. | |
| 6,731,625 B1 | 5/2004 | Eastep et al. | |
| 6,735,691 B1 | 5/2004 | Capps et al. | |
| 6,754,181 B1 | 6/2004 | Elliott et al. | |
| 6,766,314 B2 | 7/2004 | Burnett | |
| 6,826,616 B2 | 11/2004 | Larson et al. | |
| 6,839,759 B2 | 1/2005 | Larson et al. | |
| 6,850,252 B1 | 2/2005 | Hoffberg | |
| 6,870,921 B1 | 3/2005 | Elsey et al. | |
| 6,909,708 B1 | 6/2005 | Krishnaswamy et al. | |
| 6,944,279 B2 | 9/2005 | Elsey et al. | |
| 6,954,736 B2 | 10/2005 | Menninger et al. | |
| 6,957,186 B1 | 10/2005 | Guheen et al. | |
| 6,985,922 B1 | 1/2006 | Bashen et al. | |
| 7,013,290 B2 | 3/2006 | Ananian | |
| 7,039,606 B2 | 5/2006 | Hoffman et al. | |
| 7,054,837 B2 | 5/2006 | Hoffman et al. | |
| 7,069,330 B1 | 6/2006 | McArdle et al. | |
| 7,072,843 B2 | 7/2006 | Menninger et al. | |
| 7,096,495 B1 | 8/2006 | Warrier et al. | |
| 7,100,195 B1 | 8/2006 | Underwood | |
| 7,107,285 B2 | 9/2006 | von Kaenel et al. | |
| 7,120,596 B2 | 10/2006 | Hoffman et al. | |
| 7,145,898 B1 | 12/2006 | Elliott | |
| 7,149,698 B2 | 12/2006 | Guheen et al. | |
| 7,165,041 B1 | 1/2007 | Guheen et al. | |
| 7,171,379 B2 | 1/2007 | Menninger et al. | |
| 7,188,138 B1 | 3/2007 | Schneider | |
| 7,188,180 B2 | 3/2007 | Larson et al. | |
| 7,194,552 B1 | 3/2007 | Schneider | |
| 7,260,599 B2 | 8/2007 | Bauch et al. | |
| 7,353,533 B2 | 4/2008 | Wright et al. | |
| 7,363,347 B2 | 4/2008 | Thomas | |
| 7,398,552 B2 | 7/2008 | Pardee et al. | |
| 7,592,906 B1 | 9/2009 | Hanna et al. | |
| 2001/0052012 A1 | 12/2001 | Rinne et al. | |
| 2002/0078379 A1 | 6/2002 | Edwards et al. | |
| 2002/0083183 A1 | 6/2002 | Pujare et al. | |
| 2002/0184224 A1 | 12/2002 | Haff et al. | |
| 2003/0009538 A1 | 1/2003 | Shah et al. | |
| 2003/0055962 A1 | 3/2003 | Freund et al. | |
| 2003/0061404 A1 | 3/2003 | Atwal et al. | |
| 2003/0065676 A1 | 4/2003 | Gbadegesin et al. | |
| 2003/0217126 A1 | 11/2003 | Polcha et al. | |
| 2003/0217166 A1 | 11/2003 | Dal Canto et al. | |
| 2004/0031058 A1 | 2/2004 | Reisman | |
| 2004/0039827 A1* | 2/2004 | Thomas | H04L 29/06 709/228 |
| 2004/0049515 A1 | 3/2004 | Haff et al. | |
| 2004/0107342 A1 | 6/2004 | Pham et al. | |
| 2004/0107360 A1 | 6/2004 | Herrmann et al. | |
| 2004/0142686 A1 | 7/2004 | Kirkup et al. | |
| 2004/0177158 A1 | 9/2004 | Bauch et al. | |
| 2004/0177359 A1 | 9/2004 | Bauch et al. | |
| 2004/0193906 A1 | 9/2004 | Dar et al. | |
| 2004/0228362 A1 | 11/2004 | Maki et al. | |
| 2004/0268357 A1 | 12/2004 | Joy et al. | |
| 2004/0268358 A1 | 12/2004 | Darling et al. | |
| 2005/0005165 A1 | 1/2005 | Morgan et al. | |
| 2005/0015624 A1 | 1/2005 | Ginter et al. | |
| 2005/0027788 A1 | 2/2005 | Koopmans et al. | |
| 2005/0132030 A1 | 6/2005 | Hopen et al. | |
| 2005/0154738 A1* | 7/2005 | Thomas | G06F 21/554 |
| 2005/0185647 A1 | 8/2005 | Rao et al. | |
| 2005/0198380 A1 | 9/2005 | Panasyuk et al. | |
| 2005/0265351 A1 | 12/2005 | Smith et al. | |
| 2006/0005240 A1 | 1/2006 | Sundarrajan et al. | |
| 2006/0039404 A1 | 2/2006 | Rao et al. | |
| 2006/0068755 A1 | 3/2006 | Shraim et al. | |
| 2006/0075464 A1 | 4/2006 | Golan et al. | |
| 2006/0075478 A1* | 4/2006 | Hyndman | H04L 63/0218 726/11 |
| 2006/0080441 A1 | 4/2006 | Chen et al. | |
| 2006/0143703 A1 | 6/2006 | Hopen et al. | |
| 2006/0195899 A1 | 8/2006 | Ben-Shachar et al. | |
| 2006/0245414 A1* | 11/2006 | Susai | H04L 67/14 370/352 |
| 2006/0271652 A1 | 11/2006 | Stavrakos et al. | |
| 2006/0277275 A1 | 12/2006 | Glaenzer | |
| 2007/0061434 A1 | 3/2007 | Schmieder et al. | |
| 2007/0061887 A1* | 3/2007 | Hoover | G06F 21/6218 726/26 |
| 2007/0150947 A1 | 6/2007 | Vijayakumar et al. | |
| 2007/0162501 A1* | 7/2007 | Agassi | G06Q 30/02 |
| 2007/0192853 A1 | 8/2007 | Shraim et al. | |
| 2007/0294762 A1 | 12/2007 | Shraim et al. | |
| 2007/0299915 A1 | 12/2007 | Shraim et al. | |

FOREIGN PATENT DOCUMENTS

| | | |
|---|---|---|
| WO | WO-02/079949 | 10/2002 |
| WO | WO-2006/005078 A2 | 1/2006 |
| WO | WO-2006/012612 | 2/2006 |
| WO | WO-2006/074072 A3 | 7/2006 |
| WO | WO-2007/179955 | 8/2007 |

OTHER PUBLICATIONS

Final Office Action dated Sep. 1, 2009 for U.S. Appl. No. 11/462,329.

International Search Report, PCT/US2007/075035, mailed on May 6, 2008.

Non-Final Office Action dated Jan. 5, 2010 for U.S. Appl. No. 11/462,329.

Non-Final Office Action dated Mar. 16, 2009 for U.S. Appl. No. 11/462,329.

US Notice of Allowance for U.S. Appl. No. 11/462,312 dated Aug. 9, 2010.

US Notice of Allowance for U.S. Appl. No. 11/462,321 dated Mar. 21, 2013.

US Notice of Allowance for U.S. Appl. No. 11/462,329 dated Jun. 20, 2014.

US Office Action for U.S. Appl. No. 11/462,312 dated Mar. 4, 2009.

US Office Action for U.S. Appl. No. 11/462,312 dated Oct. 15, 2009.

US Office Action for U.S. Appl. No. 11/462,321 dated Mar. 11, 2009.

US Office Action for U.S. Appl. No. 11/462,321 dated Jun. 16, 2010.

US Office Action for U.S. Appl. No. 11/462,321 dated Jan. 6, 2011.

US Office Action for U.S. Appl. No. 11/462,321 dated Nov. 7, 2012.

US Office Action for U.S. Appl. No. 11/462,321 dated Dec. 1, 2009.

US Office Action for U.S. Appl. No. 11/462,321 dated Jun. 16, 2011.

US Office Action for U.S. Appl. No. 11/462,321 dated Jul. 8, 2011.

US Office Action for U.S. Appl. No. 11/462,329 dated Jan. 19, 2011.

US Office Action for U.S. Appl. No. 11/462,329 dated Nov. 19, 2013.

US Office Action for U.S. Appl. No. 11/462,329 dated Apr. 25, 2013.

US Office Action for U.S. Appl. No. 11/462,369 dated Jan. 19, 2012.

US Office Action for U.S. Appl. No. 13/943,662 dated Dec. 17, 2013.

US Office Action for U.S. Appl. No. 13/943,662 dated Aug. 11, 2014.

(56) References Cited

OTHER PUBLICATIONS

Written Opinion for International Application No. PCT/US2007/075035, mailed on May 6, 2008.
First Office Action in Chinese Patent Application No. 201310292412.2 dated Oct. 10, 2015.
US Notice of Allowance on U.S. Appl. No. 13/943,662 DTD Apr. 10, 2015.
U.S. Appl. No. 11/462,329, filed Aug. 3, 2006.
U.S. Appl. No. 11/462,321, filed Aug. 3, 2006.
U.S. Appl. No. 13/943,662, filed Jul. 16, 2013.

* cited by examiner

SYSTEMS AND METHODS FOR APPLICATION BASED INTERCEPTION OF SSL/VPN TRAFFIC

RELATED APPLICATION

This application is a continuation of and claims priority to, and the benefit of, U.S. Non-provisional application Ser. No. 11/462,329, entitled "SYSTEMS AND METHODS FOR APPLICATION BASED INTERCEPTION OF SSL/VPN TRAFFIC", filed on Aug. 3, 2006, and which is incorporated herein by reference in its entirety for all purposes.

FIELD OF THE INVENTION

The present invention generally relates to secure data communication networks and, in particular, to systems and methods for increasing the security of data communication networks by authorizing SSL/VPN data communications on a more granular basis.

BACKGROUND OF THE INVENTION

Virtual private networks provide users of a client computer with secure access to remote resources when public networks. Many virtual private networks use network appliances to provide secure connections to clients. For example, a user may access resources including applications, web sites, and files by connecting to a network appliance which manages a number of virtual private network connections. In many cases, an agent program associated with the client identifies network communications intended for the virtual private network based on the address used to send the communication.

However, this technique suffers from a number of drawbacks. Because all traffic corresponding to an address range is sent to the virtual private network, whether appropriately sent to the network or not, robust authorization policies must be created to filter appropriate virtual private network traffic from traffic that should not be sent on the virtual private network. Such policies are difficult to create and difficult to maintain. Also, blanket routing of all data communication to a virtual private network, whether appropriate or not, can increase security risks, since a malicious user may use data traffic having the correct address range to cause harm to the data center the virtual private network is meant to protect.

It would, therefore, be desirable to provide systems and methods to route data in a virtual private network environment on a more granular basis than subnet identification.

BRIEF SUMMARY OF THE INVENTION

In one aspect, the present invention relates to a method for intercepting communication of a client to a destination on a virtual private network. The decision to intercept is based on a network destination description of an application authorized to be accessed via the virtual private network. An agent executing on the client intercepts a network communication of the client. The agent provides a virtual private network connection from a first network to a second network. The agent determines that a destination specified by the intercepted communication corresponds to a network identifier and a port of a network destination description of an application on the second network authorized for access via the virtual private network. In response to this determination, the agent transmits the intercepted communication.

In some embodiments, the agent determines that the network communication does not correspond to the network destination description of the application and transmits the intercepted network communication via the first network. In other embodiments, the agent determines that the network communication does not correspond to the network destination description of the application and drops the intercepted network communication. In still other embodiments, the agent determines that the network identifier and the port of the client correspond to a source internet protocol address and a source port of the network destination description of the application. In still other embodiments, the agent determines a type of protocol for which the network communication is formatted corresponds to a protocol specified by the network destination description of the application. In yet other embodiments, the agent determines not to intercept a second network communication of the client destined to a second application not authorized for access to the second network via the virtual private network connection. In some of these embodiments, the agent intercepts network communication transparently to one of the application or a user of the client.

In another aspect, the present invention relates to a method for providing a level of access, by an appliance, to a resource by an application on a client via a virtual private network connection. A decision to allow or deny a level of access is based on identification of the application. The appliance intercepts a request from an application on a client on a first network to access via a virtual private network connection a resource on a second network. The appliance identifies the application and associates with the intercepted request an authorization policy based on the identity of the application. In one embodiment, the appliance determines, using the authorization policy and the identity of the application, to either allow or deny access by the application to the resource.

In some embodiments, the agent transmits a name of the application to the appliance. In further of these embodiments, name of the application is used as the identifier of the application. In other embodiments, the agent establishes the virtual private network connection to the second network via the appliance. In still other embodiments, an authorization policy specifies a name of the application and an authorization to either access or deny a level of access. In some of these embodiments, the appliance associates the authorization policy of the application with a user of the client. In others of these embodiments, the appliance identifies the authorization policy of the application based on a user of the client.

In yet another aspect, the present invention relates to a method for intercepting, by an agent of a client, communications from the client to be transmitted via a virtual private network connection. The interception is based on identification of an application from which the communication originates. The agent receives information identifying a first application. The agent determines a network communication transmitted by the client originates from the first application and intercepts that communication. The agent transmits the intercepted communication via the virtual private network connection.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
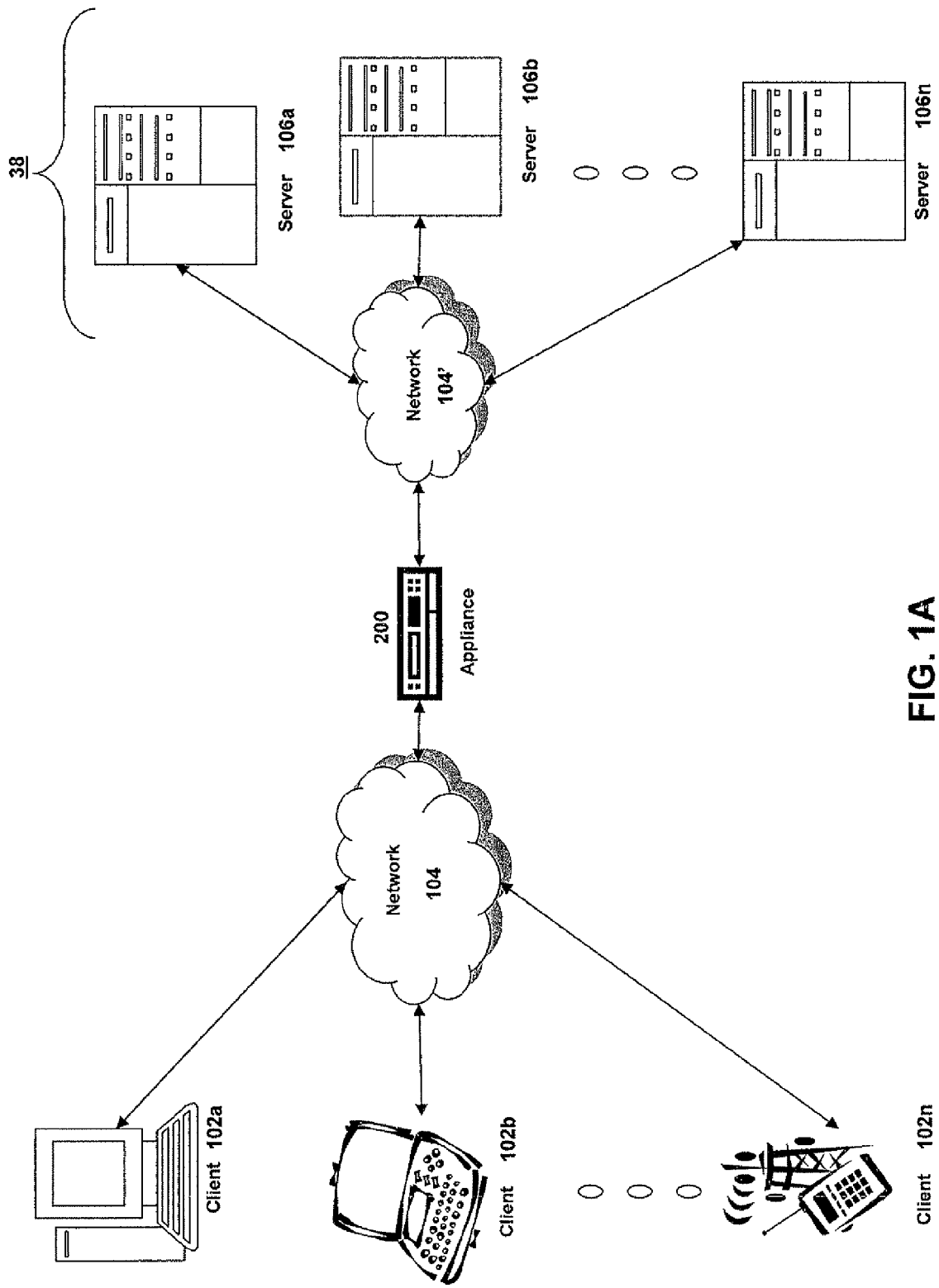
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102*a*-102*n* (also generally referred to as local machine(s) 102, or client(s) 102) in communication with one or more servers 106*a*-106*n* (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
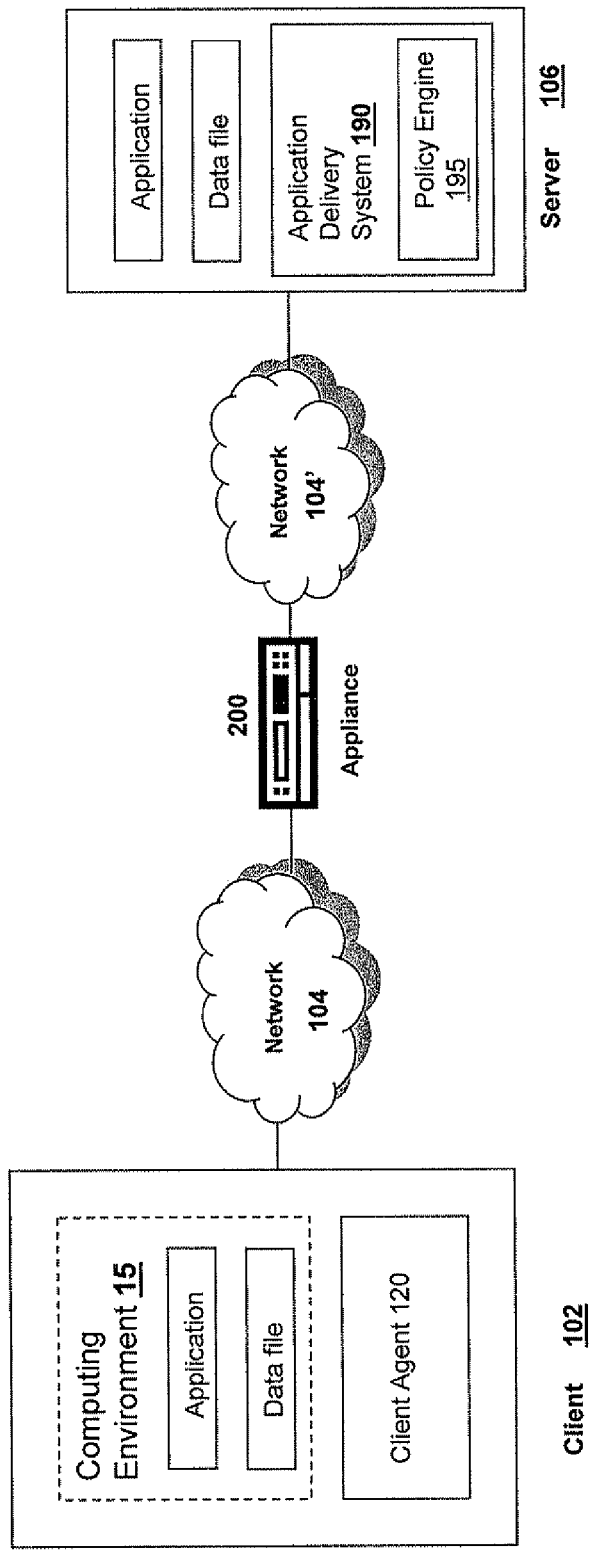
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
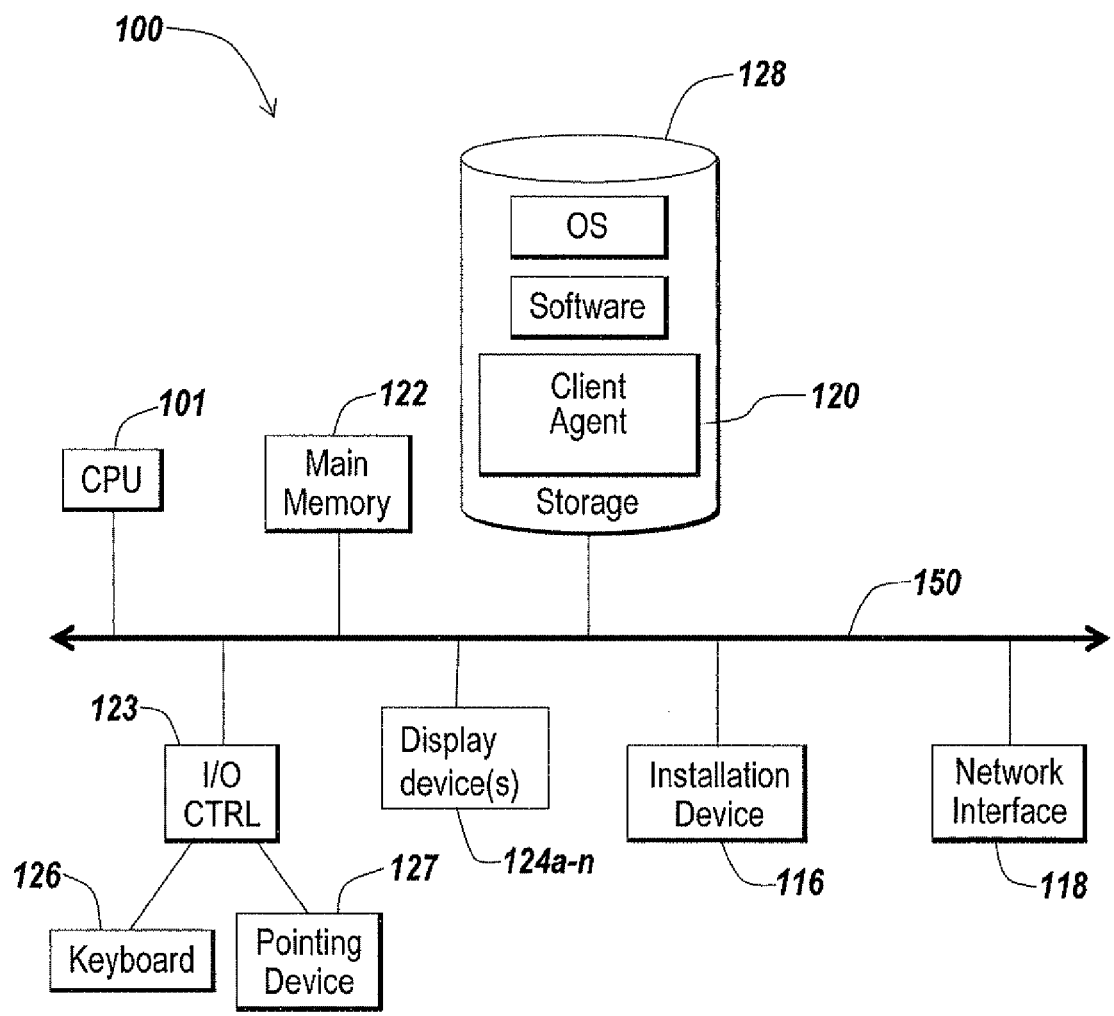
FIGS. 1C and 1D are block diagrams of embodiments of a computing device.
Figure 1D:
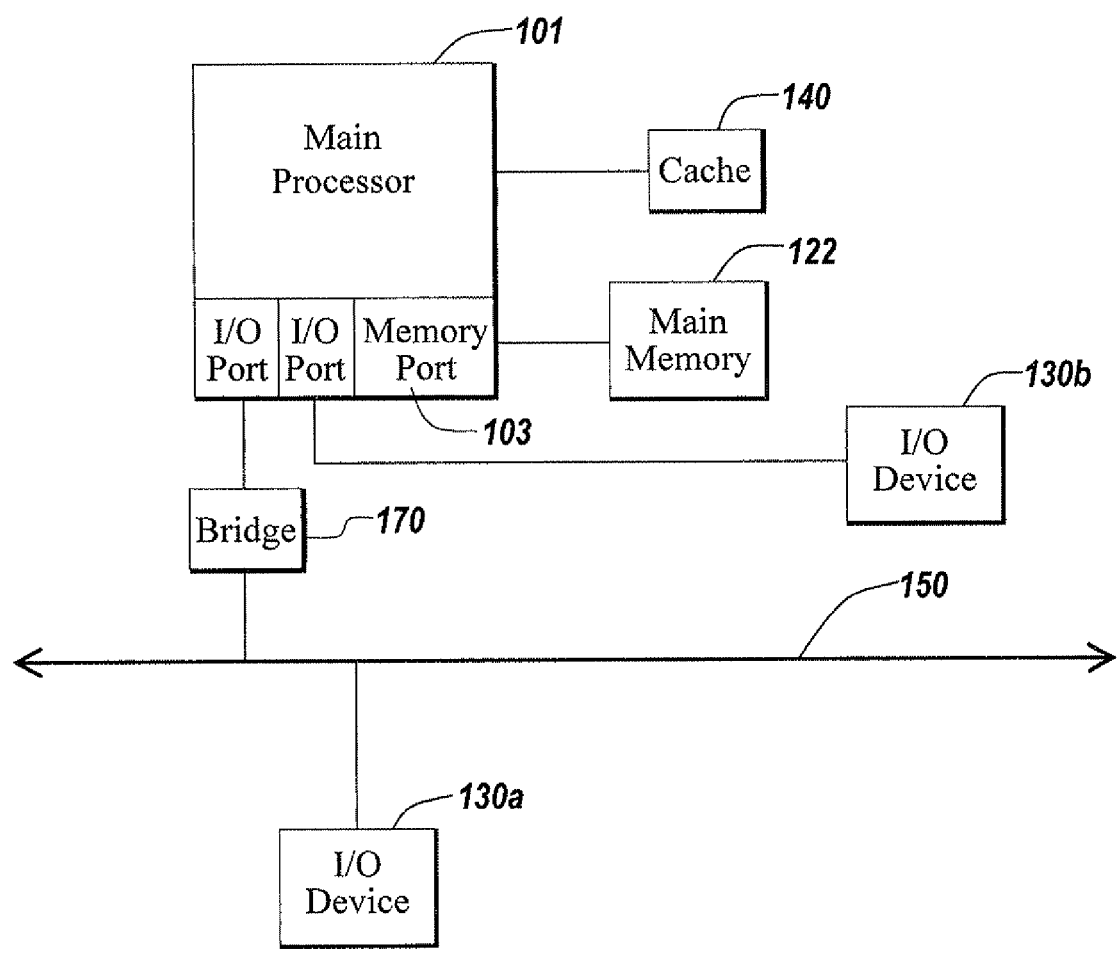

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
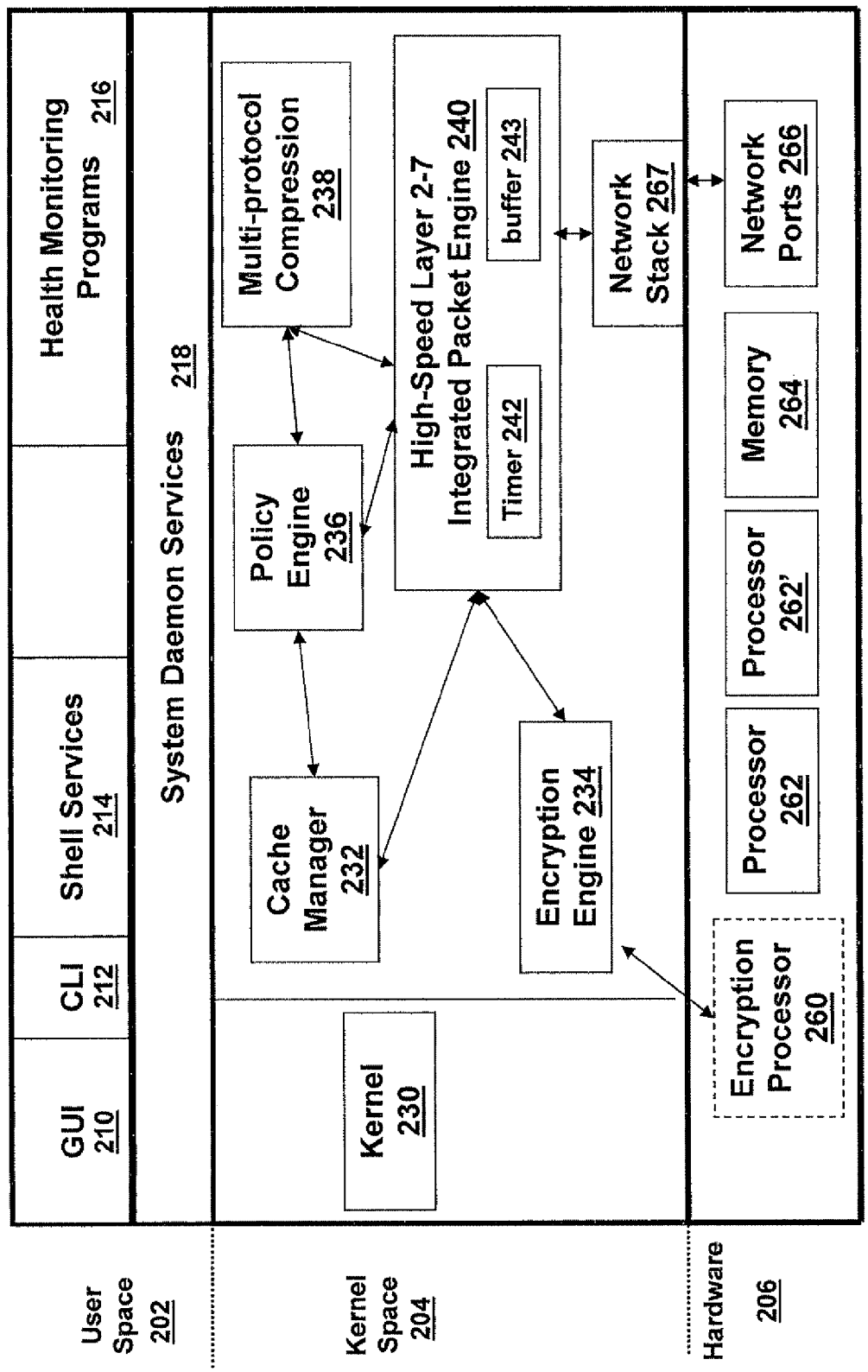
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
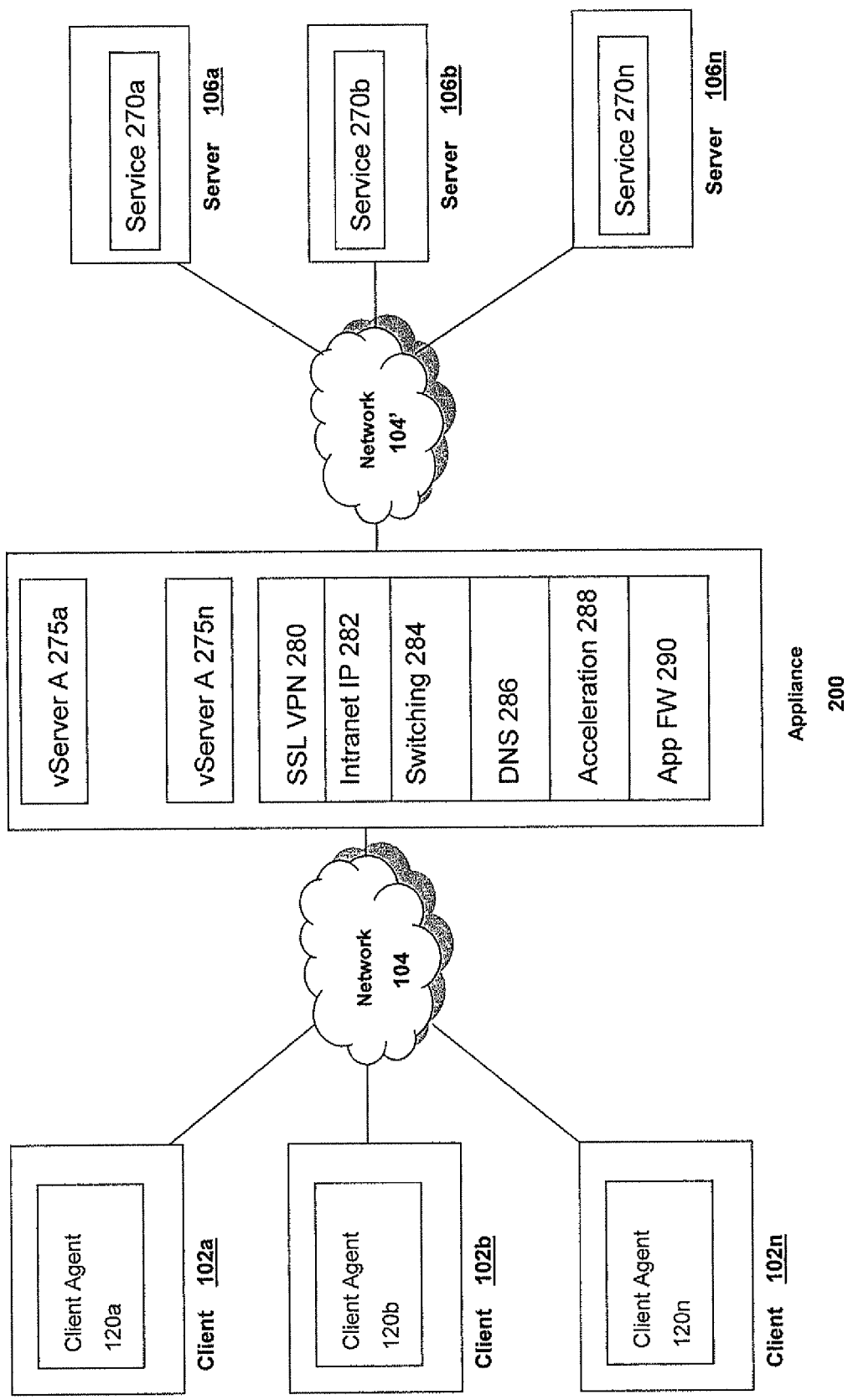
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
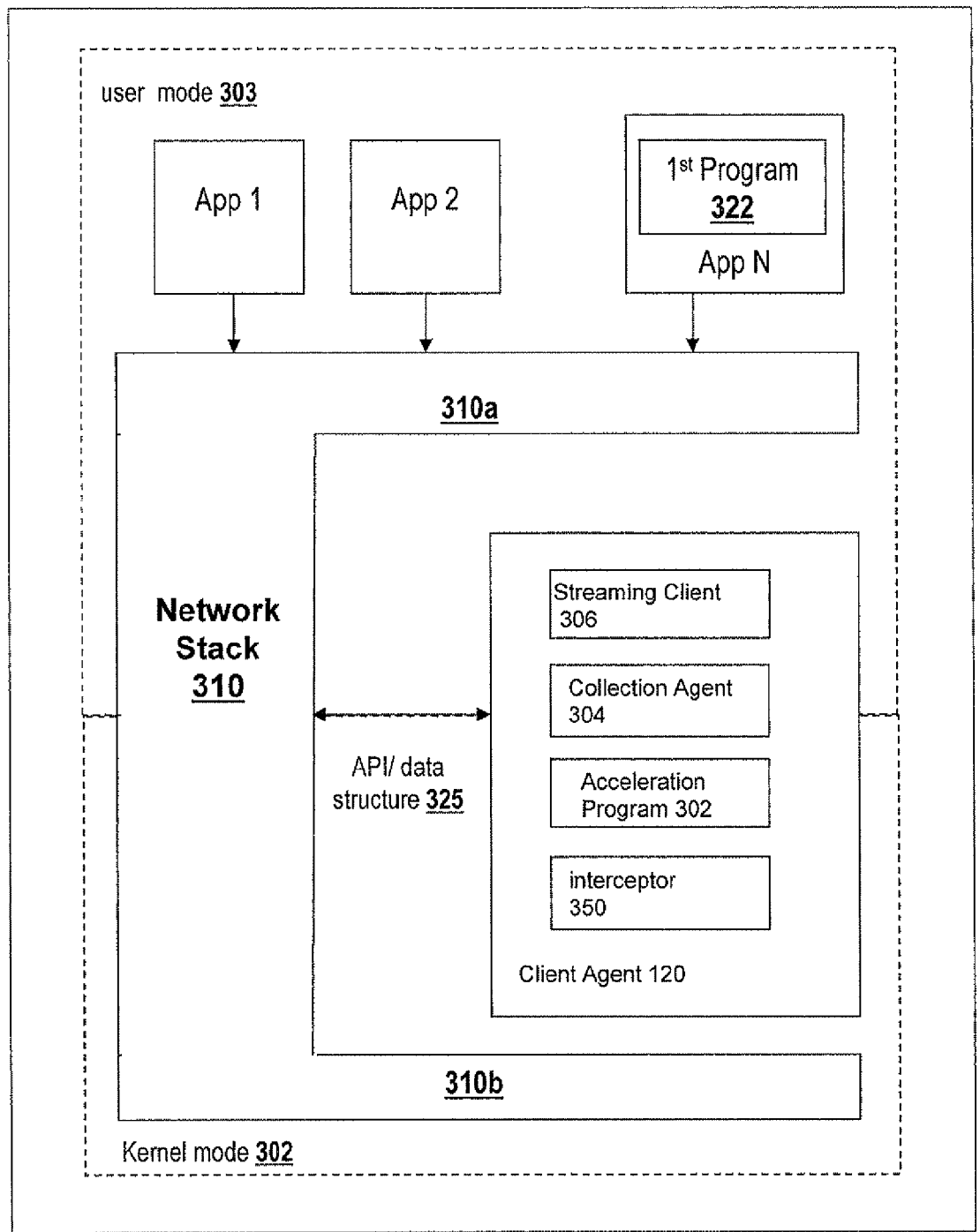
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client agent 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Fine-Grained Client-Side Interception

Figure 4:
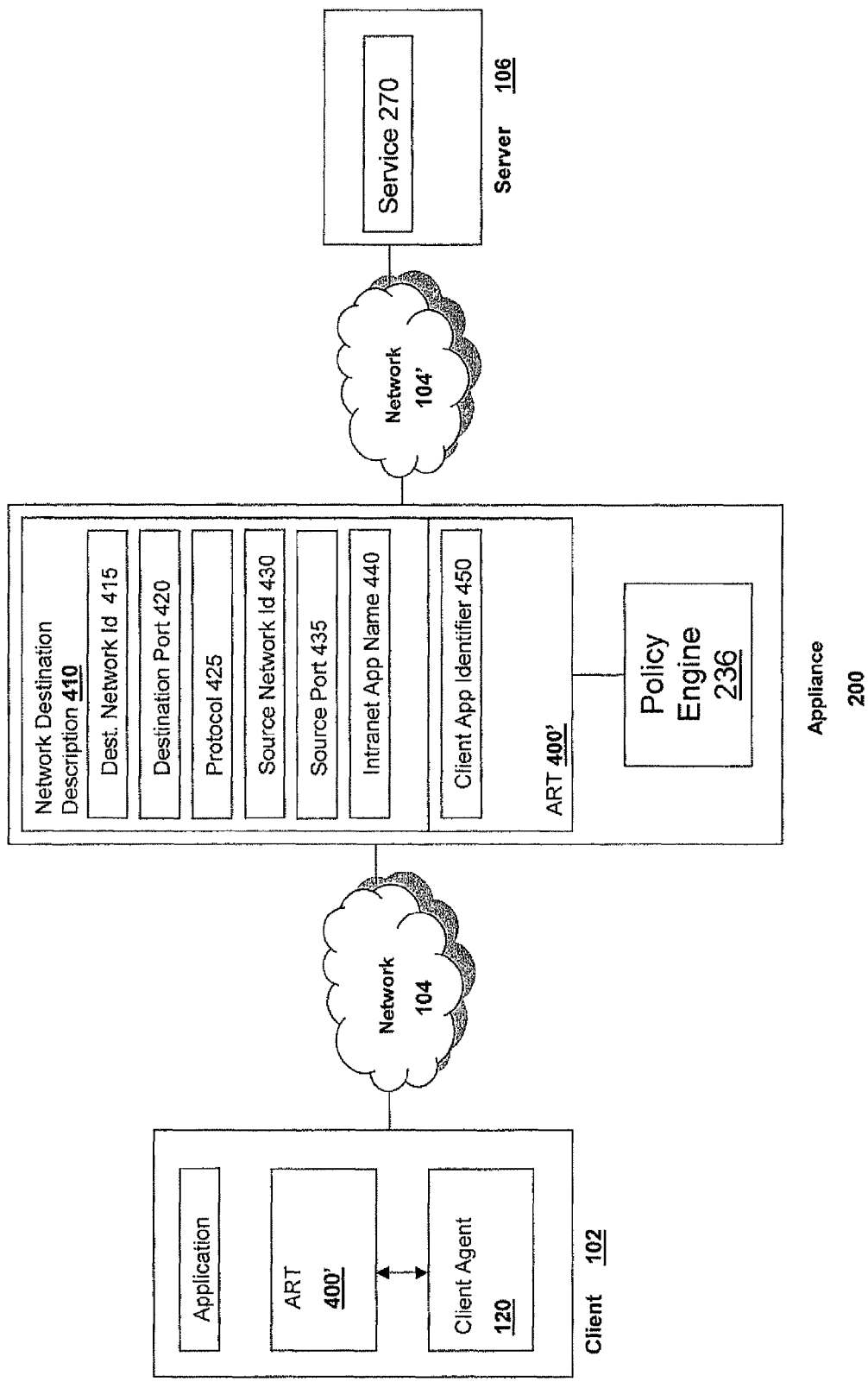
FIG. 4 is a block diagram of an embodiment of a client-side fine-grained interception mechanism.

Referring now to FIG. 4, an embodiment of a system for providing fine-grained client-side interception is depicted. In one embodiment, the system of FIG. 4 provides a more granular mechanism for intercepting communication of a client 102 having an SSL VPN connection to network 104' via the appliance 200. In brief overview, the appliance 200 comprises an application routing table 400. The application routing table (ART) 400 provides a network destination description 410 and/or a client application identifier 450. In some embodiments, the application routing table 400 via the network destination description identifies the applications or services 270 on servers 106 which are authorized for access by a client 102. In other embodiments, the application routing table 400 identifies via the client application identifier 450 an application running on the client 102 that may be authorized for a level of access to the server 106, or a service 270 of the server 106. The appliance 200 may transmit the application routing table 400 to the client 102 or client agent 120. The client agent 120 uses the application routing table 400 to make determination on whether to intercept and transmit client network communication to the appliance 200, such as via a SSL VPN tunnel to appliance, based on the application routing table 400.

The application routing table 400 comprises any type and form of table, database, object or data structure for arranging and storing information as described herein. In some embodiments, the application routing table 400 is populated, configured, created, edited or modified via a command line interface 212 or graphical user interface 210 of the appliance. In other embodiments, application routing table 400 is populated, configured, created, edited or modified via the client 102, server 106 or another computing device 100. In one embodiment, the client 102 receives the application routing table 400 from the appliance 200. For example, the client agent 120 receives the application routing table 400 upon establishing a connection with the appliance 200. In another example, the client agent 120 downloads the application routing table 400 from a server, a web-site or any other computing device 100 on the network 104. In another embodiment, a user creates or modifies the application routing table 400 on the client 102.

In some embodiments, the application routing table 400 comprises one or more network destination descriptions 410. The network destination description 410 may comprise information identifying one or more of the following: a destination network identifier 415, a destination port 420, a protocol 425, a source network identifier 430, a source port 435, and an intranet application name 440. The destination network identifier 415 and source network identifier 430 may comprise a host or domain name, and/or an internet protocol address. In some embodiments, destination network identifier 415 and source network identifier 430 comprises a range of internet protocol addresses, a list of internet protocol addresses and/or a list of domain or host names. The destination port 420 and source port 435 identifies one or more port numbers for a network communication endpoint. For example, the destination port 430 may identify port 80 for http traffic an http or web-server. In another example, the destination port 430 may identify port 21 for file transfer protocol (ftp). In some embodiments, the protocol identifier 425 identifies one or more types of protocol by name, number, version or application. In other embodiment, the protocol identifier 425 identifies the protocol by layer of the network stack, such as Layer 1-7. In one embodiment, the intranet application name 440 identifies a name or identifier of an application associated with the destination network identifier 415 and/or destination port 420. For example, the intranet application name 440 may identify a name of the email, database, or a corporate application being accessed via the destination network identifier 415 and/or destination port 420.

In one embodiment, the network destination description 410 identifies by internet protocol layer information or network layer information a location of an application or service 270 on a network 104. For example, a destination network identifier 415 and destination port 420 may identify a destination location of an application on a network 104. In some embodiments, the network destination description 410 identifies a destination authorized for access via the appliance 200. In another embodiment, the network destination description 410 identifies by internet protocol layer information or network layer information a location of a client accessing the application or service 270 of a server 106 via the network 104. For example, a destination network identifier 415 and destination port 420 may identify a destination location of an application on a network. In some embodiments, the network destination description 410 identifies a client authorized to access the network 104 or server 106 via the appliance 200. In yet another embodiment, the network destination description identifies by internet protocol or network layer information the source and destination of traffic flow between a client 102 and a server 106. In one embodiment, the network destination description 410 identifies a traffic flow between a client 102 and server 106 authorized for access via the appliance 200.

In some embodiments, the application routing table 400 comprises one or more client application identifiers 450. The client application identifier 450 identifies an application installed or operating on the client 102 authorized for access to a network 104 or a server 106 via the appliance 200. In one embodiment, the client application identifier 450 comprises a name of an executable file for the application, such a the name of the .exe file of the application. For example, the client application identifier 405 may include the name "explorer.exe", "outlook.exe" or "winword.exe". In other embodiments, the client application identifier 450 identifies an image name of a process or executable. In another embodiment, the client application identifier 450 comprises a name of a script. In yet another embodiment, the client application identifier 450 comprises a name of a process, task or service that may or is operating on the client 102. In still another embodiment, the client application identifier 450 comprises a process identifier, or PID, or a range of PIDS.

In one embodiment, the policy engine 236 of the appliance 200 comprises one or more rules associated with the application routing table 400, or any portion thereof. In some embodiments, the policy engine 236 comprises a policy for access, authorization, and/or auditing based on a network destination description 410. In other embodiments, the policy engine 236 comprises a policy for access, authorization, and/or auditing based on a client application identifier 450. In another embodiment, the policy engine 236 comprises a policy for session and/or traffic management policies based on the network destination description 410 and/or client application identifier 450. In yet another embodiment, the client 102 comprises a policy engine 236 for applying one or more policies or rules based on the network destination description 410 and/or client application identifier 450.

In operation, the client agent 120 uses the application routing table 400 for determining the network communications on the network stack 310 to intercept. In one embodiment, the client agent 120 intercepts network communication having information identifying or corresponding to a network destination description 410. For example, the client agent 120 may intercept a network packet on the network stack 310 destined for a destination network identifier 415 and/or destination port 420 of a network destination description 410 of an application routing table 400. In another embodiment, the client agent 120 intercepts network communications on the network stack 310 originating from an application on the client 102 corresponding to a client application identifier 450 of the application routing table 400. In other embodiments, the client agent 120 does not intercept network communications on the network stack 310 that do not correspond to either a network destination description 410 or a client application identifier 450.

Figure 5:
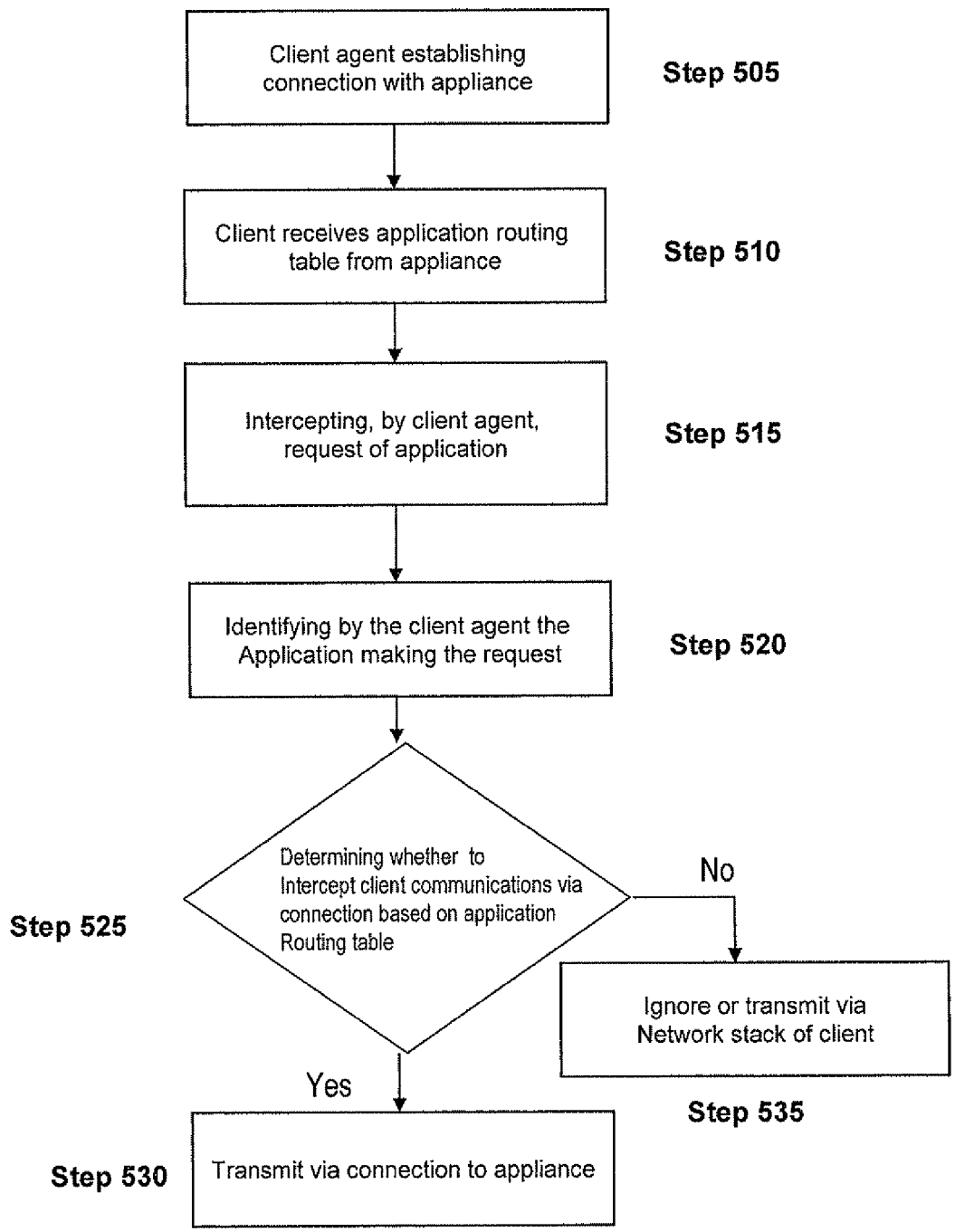
FIG. 5 is a flow diagram depicting steps of an embodiment of a method for practicing client-side fine-grained interception techniques.

Referring now to FIG. 5, an embodiment of a method 500 for a client 102 intercepting network communications of the client 102 based on the granularity specified by the application routing table 400 is depicted. In brief overview, the method 500, at step 505, the client 102 establishes a connection with the appliance 200, such as an SSL VPN connection. At step 510, the client agent 120 receives an application routing table 400 from the appliance 200. At step 515, the client agent 120 intercepts a request of the client 102. In one embodiment, the client agent 120, at step 520, identifies the application originating or generating the request. At step 525, the client agent 102 determines whether to transmit the intercepted request via the connection with the appliance 200 based on the application routing table 400. For example, if the request originates from an application identified by the client application identifier 450, the client agent 120 transmits the intercepted request via the connection to the appliance 200. If, at step 530, the client agent 120 determines the intercepted request is allowed access to the network 104 via the appliance 200, the client agent 120 transmits the intercepted request via the connection to the appliance 200. Otherwise, the client agent 120 drops the request or allows it to be transmitted via the network stack 210 of the client 102.

In further detail, at step 505, the client agent 102 establishes a transport layer connection with the appliance 200, such as via the transport control protocol or user datagram protocol. In one embodiment, the client agent 120 establishes a tunnel connection with the appliance 200 using any type and form of tunneling protocol. In another embodiment, the client agent 120 establishes a virtual private network connection via the appliance 200 to a network 104. For example, the client agent 120 may establish a virtual private network connection with the appliance 200 to connect the client 102 on the first network 104 to a second network 104'. In some embodiments, the client agent 120 establishes a SSL VPN connection with the appliance 200. In yet another embodiment, the client agent 120 establishes a tunnel or virtual private network connection using Transport Layer Secure (TLS) protocol. In one embodiment, the client agent 120 establishes a tunnel connection using the Common Gateway Protocol (CGP) manufactured by Citrix Systems, Inc. of Ft. Lauderdale, Fla.

At step 510, the client agent 120 obtains or receives an application routing table 400 from the appliance 200, a user of the client 200, or a computing device 100. In one embodiment, the client agent 120 receives the application routing table 400 upon establishing a connection with the appliance 200. For example, the client agent 120 may request the application routing table 400 from the appliance 200. In another embodiment, the appliance 400 transmits the application routing table 400 to the client agent 120. For example, if a change to the application routing table 400 is made, the appliance 200 may transmit or push the changes to the client agent 120. In some embodiments, the client agent 120 loads or opens the application routing table 400 from storage on the client 120 or a computing device 100 accessible via the network 104. In yet another embodiment, the client agent 120 downloads the application routing table 400 from a web-site, such as via http. In a further embodiment, the client agent 120 transfer a file having the application routing table 400 via a file transfer protocol (FTP). In one embodiment, a user creates or generates the application routing table on the client 120. In another embodiment, a user configures the client agent 120 to have the application routing table 400.

At step 515, the client agent 120 intercepts on the network stack 310 a request of the client 102. In one embodiment, the client agent 120 intercepts a request to open a transport layer connection from an application on the client 102. In another embodiment, the client agent 120 intercepts a request of an application for an established transport layer connection. In some embodiments, the client agent 120 intercepts a network packet destined for the first network 104 of the client 102. In another embodiment, the client agent 120 intercepts a network packet destined for a second network 104 provided by a VPN connection to the appliance 200. In one embodiment, the client agent 120 intercepts a transport layer network packet at an interface at the transport layer of the network stack 310, such as via the transport driver interface (TDI). In other embodiments, the client agent 120 intercepts a network packet at any layer at or below the transport layer or layer 4 of the network stack 210, such as the network or IP layer. In still another embodiment, the client agent 120 intercepts a network packet at layer 4 and above, such as the application layer of the network stack 310.

In some embodiments, the client agent 120, at step 520 identifies an application generating or originating the intercepted request by any suitable means and/or mechanism. In one embodiment, the client agent 120 determines an identifier of the application via a system level or kernel-mode function call. In one embodiment, the client 120 determines via an application programming interface (API) the process id (PID) and/or the name of the application associated with the connection or context from which the request was intercepted. In some embodiments, the client agent 120 determines an identifier of the application at the time the client agent 120 intercepts the application's connection request via the network stack 210. In other embodiments, the client agent 120 determines an identifier of the application via inspection of a payload of the intercepted request. In one embodiment, the client agent 120 stores the application identifier in a storage, such as a data structure, object, table, file or database. In another embodiment, the client 120 associates or maintains an associations of an identifier of the application with a transport layer connection of the application, such as the transport layer connection established via the client agent 120 to the appliance 200.

At step 525, the client agent 102 uses the application routing table 400 to determine which network communications of the client 102 to intercept and transmit via the established connection with the appliance 200. In some embodiments, the client agent 120 intercepts network communications of the client 120 on a first network 104 and transmit via a transport layer connection or application layer protocol to a second network 104' via the appliance 200. By intercepting only those network communications of the client corresponding to a network destination description 410 and/or client application identifier 450 of the application routing table 400, the client agent 120 provides a more secure mechanism and finer grain control of transmitting network communications via the tunnel or connection to the second network 104'. In one embodiment, the client agent 120 inspects or analyzes the intercepted request to determine one or more of the following information: destination IP address, destination port, source IP address, and source port. In some embodiments, the client agent 120 obtains any of the network layer or IP related information of the network packet of the request.

In one embodiment, the client agent 120 compares the information of the intercepted request with the network destination description 410 of the application routing table 400. If the intercepted request matches the network destination description 410, the client agent 120 transmits, at step 430, the intercepted request via the connection to the appliance 200. In other embodiments, if the intercepted request does not correspond to a network destination description 410, the client agent 120, at step 435, does not transmit the intercepted request via the connection to the appliance 200. In some embodiments, the client agent 120 drops the intercepted request. In another embodiment, the client agent 120 does not intercept the request but allows it to pass via the network stack 310 of the client 120. In some cases, the client 102 transmits the request via the first network 104 of the client instead of via the connection to the appliance 200.

In one embodiment, the client agent 120 determines an identifier of the application from the intercepted request. In some embodiments, the client agent 120 looks up the application associated with the context or connection of the request. In another embodiment, the client agent 120 determines a name and/or PID of the application via a system API call. In some embodiments, the client agent 120 identifies the application from inspection on analysis of the network packet of the request. For example, in one embodiment, the client agent 120 uses information from a payload of the network packet to identify the application.

In one embodiment, the client agent 120, at step 425, compares the information of the intercepted request with the client application identifier 450 of the application routing table 400. If the application identifies as originating or transmitting the intercepted request matches the client application identifier 450, the client agent 120 transmits, at step 430, the intercepted request via the connection to the appliance 200. In other embodiments, if the intercepted request does not correspond to the client application identifier 450, the client agent 120 does not transmit the intercepted request via the connection to the appliance 200. In some embodiments, the client agent 120 drops the intercepted request. In another embodiment, the client agent 120 does not intercept the request but allows it to pass via the network stack 310 of the client 120. In some cases, the client 102 transmits the request via the first network 104 of the client instead of via the connection to the appliance 200

In some embodiments, the application routing table 400 identifies a network destination description 410 and/or client application identifier 450 that the client agent 120 should not intercept. As such, in one embodiment, the method 500 described above is used to determine which network packets or client requests to not transmit via the appliance based on information in the application routing table 400. In another embodiment, the client agent 120 transmits any network communication of the client 102 or application via the appliance 200 unless it corresponds to a network destination description 410 or client application identifier 450.

With the above described method 500, the client agent 120 intercepts and transmits those network packets of the client 120 meeting finely controlled application descriptions. In this manner and in some embodiments, the client agent 120 and appliance 200 provide a more secure network tunneling mechanism to connect the client 102 to a private network 104'. In one embodiment, the client agent 120 intercepts network packets having certain network layer and routing information and switches the transmission of the network packet via layer 4 or application layer information via a transport layer connection to the appliance 200.

Figure 6:
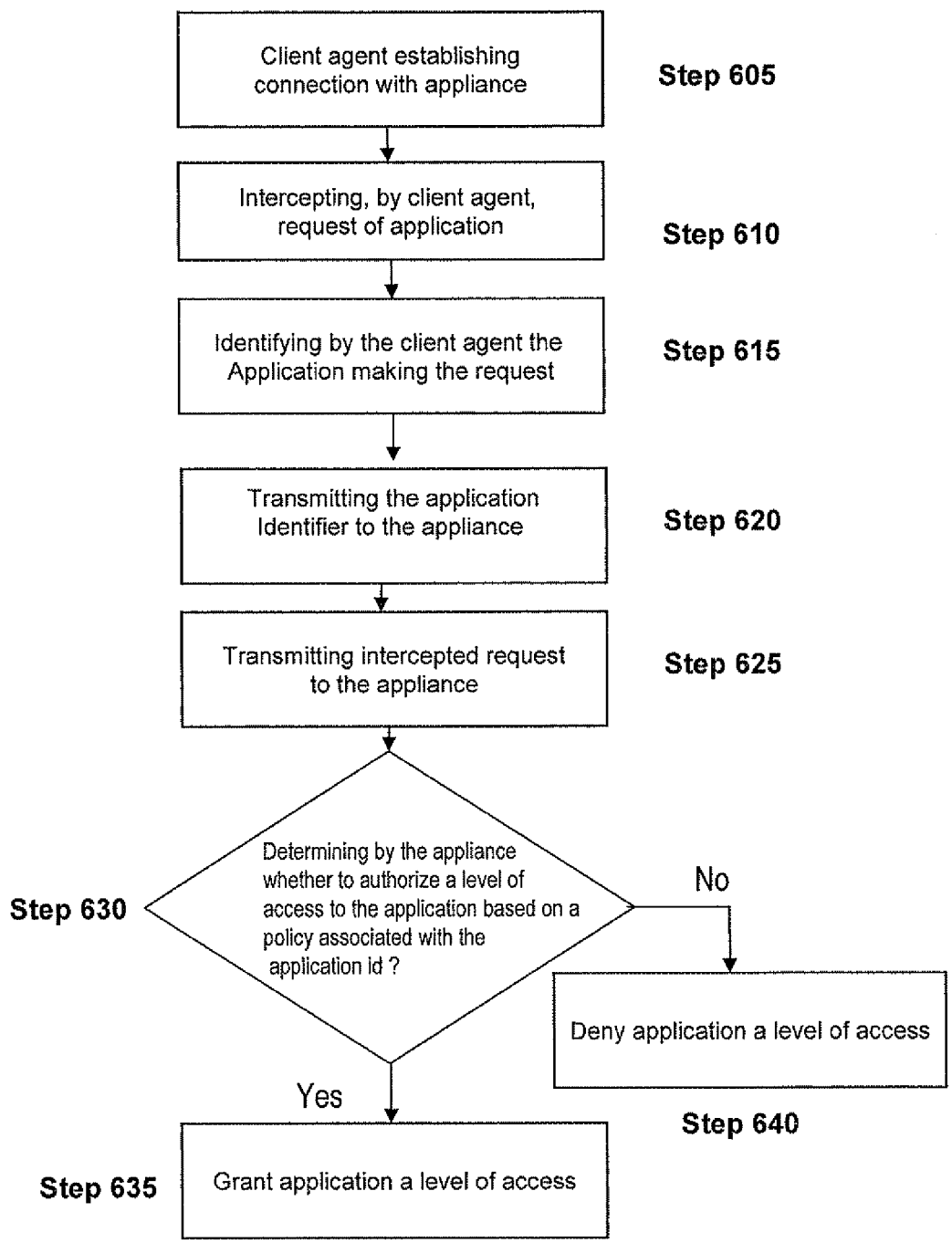
FIG. 6 is a flow diagram depicting steps of an embodiment of a method for practicing a technique for providing levels of access to an application by an appliance based on identification of the application.

Referring now to FIG. 6, steps of an embodiment of a method 600 are depicted for applying a policy to control an application's access via the appliance 200 based on identification of the application. In brief overview, at step 605, the client agent 102 establishes a connection with the appliance 200. At step 610, the client agent 102 intercepts a request of an application on the client 102, and step 615, identifies the application on the client making the request. At step 620, the client agent 120 transmits an identifier of the application to the appliance 200. At step 625, the client agent 120 transmits an intercepted request of the application to the appliance 200. At step 630, the appliance 200 determines a level of access to provide the application of the client 102 based on the identification of the application and an associated policy. At step 635, in one embodiment, the appliance 200 grants the application a level of access via the appliance to one of a network 104 or server 106. In another embodiment, the appliance 200, at step 640, denies the application a level of access via the appliance to the network 104 or server 106.

In further details, at step 605, the client 102, such as via client agent 120, establishes a connection with the appliance 200. In some embodiments, the client agent 102 establishes a transport layer connection with the appliance 200, such as via the transport control protocol or user datagram protocol. In one embodiment, the client agent 120 establishes a tunnel connection with the appliance 200 using any type and form of tunneling protocol. In another embodiment, the client agent 120 establishes a virtual private network connection via the appliance 200 to a network 104, such as a SSL VPN or TLS VPN connection. In yet another embodiment, the client agent 120 establishes a tunnel connection using the Common Gateway Protocol (CGP) manufactured by Citrix Systems, Inc. of Ft. Lauderdale.

At step 610, the client agent 120 intercepts on the network stack 310 a request of the application. In one embodiment, the client agent 120 intercepts a request to open a transport layer connection to a server 104 via the appliance 200. In another embodiment, the client agent 120 intercepts a request of an application to a server via an established transport layer connection with the appliance 200. In some embodiments, the client agent 120 intercepts a network packet destined for the first network 104 of the client 102. In another embodiment, the client agent 120 intercepts a network packet destined for a second network 104 provided by a VPN connection to the appliance 200. In one embodiment, the client agent 120 intercepts a transport layer network packet at an interface at the transport layer of the network stack 310, such as via the transport driver interface (TDI). In other embodiments, the client agent 120 intercepts a network packet at any layer at or below the transport layer or layer 4 of the network stack 210, such as the network or IP layer. In still another embodiment, the client agent 120 intercepts a network packet at layer 4 and above, such as the application layer of the network stack 310.

The client agent 120, at step 615, identifies the application generating or originating the intercepted request. In one embodiment, the client agent 120 determines an identifier of the application via a system level or kernel-mode function call. In one embodiment, the client agent 120 determines via an application programming interface (API) the process id (PID) and/or the name of the application associated with the connection or context from which the request was intercepted. In some embodiments, the client agent 120 determines an identifier of the application at the time the client agent 120 intercepts the application's connection request via the network stack 210. In other embodiments, the client agent 120 determines an identifier of the application via inspection of a payload of the intercepted request. In one embodiment, the client agent 120 looks up or queries the application identifier from a data structure, object, table, file or database. In another embodiment, the client 120 associates or maintains an association of an identifier of the application with a transport layer connection of the application via the agent 102 to the appliance 200.

At step 620, the client agent 120 transmits an identifier of the application, such as name or PID, to the appliance 200. In one embodiment, the client agent 120 transmits the identifier of the application via the connection established at step 605, e.g., the application's transport layer connection to the appliance 200. In some embodiments, the client agent 120 transmits the identifier of the application to the appliance 200 via a header or field of the network packet. In yet one embodiment, the client agent 120 transmits the identifier of the appliance 200 as part of the payload of a network packet transmitted to the appliance 200. In another embodiment, the client agent 120 transmits the identifier of the application via a control or communication channel between the client agent 120 and the appliance 200. For example, the client agent 120 and appliance 200 may communicate information by a transport layer connection, such as TCP or UDP, established for exchanging information. In some embodiments, the client agent 120 may make a remote procedure or function call to the appliance 200 to identify the application to the appliance 200. In one embodiment, the appliance 200 associates the identifier of the application to the connection of the application established by the appliance 200. In yet another embodiment, the appliance 200 determines the identify of the application 200 upon a connection request of the application via the appliance 200 or by inspecting or analyzing content of network traffic of the application via the appliance 200.

At step 625, the client agent 120 transmits an intercepted request of the application to the appliance 200. The request may be any type and form of network communication from the application. In one embodiment, the client agent 120 transmits a connect request of the application on the client 102 to the appliance 200. For example, the application may request to open a transport layer, SSL or TLS connection with the appliance 200 or to a server 106 via the appliance 200. In other embodiments, the client agent 120 may intercept network communications of the application to be transmitted via the connection to the appliance 200, and transmit the intercepted network communications to the appliance 200. In one embodiment, the client agent 120 transmits the identification of the application with the transmission of the intercepted request. In other embodiments, the appliance 200 has received from the client agent 120 identification of the application for the connection to the appliance 200.

At step 630, the appliance 200 determines a level of access to provide the application of the client 102 based on the identification of the application and an associated policy. For the intercepted request transmitted at step 625, the appliance 200 determines from a policy associated with the application, a level of access to provide to the application. In one embodiment, the appliance 200 received the intercepted request from the client agent 120, and looks up the policy for the application associated with the request or the connection used to transmit the request. In some embodiments, the policy for the application provided by the policy engine 236 identifies the type of authentication, access and/or auditing to apply to the intercepted request. In some other embodiments, the appliance 200 may determine what to audit, the location of the audit log, and the type and level of auditing to perform based on the identification of the application.

A policy may be associated with a list of one or more applications, by name of application, type of application or by pattern matching names of applications, such as all application beginning with "ms*.exe", or ending in a certain file type extension such as "*.pl. In some embodiments, the In one embodiment, the policy identifies for the application the type of authentication to perform. For example, the policy may indicate to request a certificate from the application to transmit to the intercepted request on the network 104' or to the server 106. In another example, the policy may indicate that the application may need to perform two-factor or double authentication to be granted access via the appliance 200. In some embodiments, the policy may indicate the type of authentication based on the type of request of the application. For example, a first authentication type such as two-factor authentication may be required for an open connection request to a server 106, and a second authentication type for a query to a protected directory on the server 106.

In another embodiment, the policy identifies a level of access via the appliance 200 to a network 104' or server 106. In one embodiment, the policy identifies access is either granted or denied by the identifier of the application. For example, the appliance 200 may deny or grant access by an application with a specific name, such as "outlook.exe" or "msword.exe". In another embodiment, the appliance 200 may grant access to all applications unless the identifier of the application matches a list of one or more applications not to be given access via a policy. In some embodiments, the appliance 200 may deny access to all applications unless the identifier of the application matches a list of one or more applications to be given access via a policy. In yet another embodiment, the appliance 200 may provide or assign one of a plurality of access levels to the intercepted request or application based on the identifier of the application. For example, a first application may be assigned a quarantined or limited level of access to a network 104 or server 106 via the appliance. In another example, a second application may be assigned to a user group based on the name of the application, such as assigning the application named "perforce.exe" to an engineering user group, or the name of a financial or ERP application to a financial user group.

Based on the policy determination of step 630, the appliance, at step 635, in one embodiment, the appliance 200 grants the application a level of access via the appliance to one of a network 104 or server 106. In some embodiments, based on the authentication provided by the application, such as receiving or not receiving a certificate, and the identification of the application, the appliance 200 may assign the level of access of the appliance, such as downgrading or upgrade the access level. In one embodiment, the appliance 200 grants access by the application and transmits the intercepted request to its destination. In another embodiment, the appliance 200 grants access by the application on receipt of a first request, and then the appliance 200 allows continued access by the application after applying the policy to the first request. In some embodiments, the appliance 200 applies the application-based policy to each intercepted request transmitted via the appliance 200. In yet other embodiments, the appliance 200 applies application-based policies to types of requests of the application.

In another embodiment, the appliance 200, at step 640, denies the application a level of access via the appliance to the network 104 or server 106. In some embodiments, the appliance 200 based on the application-based policy denies any access by the application and drops the intercepted request. In other embodiments, the appliance 200 downgrades the level of access by the application 220 and transmits the intercepted request according to the assigned level of access. In one embodiment, the appliance 200 denies access by the application on a per request basis. On some requests of an application, the appliance 200 denies access while on other requests the appliance 200 grants access. For example, the appliance may apply a per request policy based on the type of request.

In some embodiments, the appliance 200, at steps 630, 635 and/or 640 may make an authentication, authorization and/or auditing policy decision based on the identification of the application and any temporal information, such as the time of the request, the time the application established a connection via the appliance, and/or any temporal policy rules. For example, the appliance 200 may be authorized for access during a certain time period. If the appliance receives an intercepted request at time outside the authorized time period, the appliance 200 may have a policy to deny access for the intercepted request. Additionally, the application based policies may be combined with user or group policies to make additional access, authorization and authentication policy decisions to provide or not provide a level of access by the appliance.

In view of the structure, functions and operations of the client agent and appliance described above, the client agent provides a finer grain of control over the network communications of the client to be transmitted via the appliance, such as via an SSL VPN connection. The client agent 120 may intercept communications by application name or any portion and combination of the network or IP layer information, such as destination and source IP addresses and destination and source ports. In this manner, the client agent 120 can be configured to intercept specific network traffic patterns, such as traffic to a specific application, from a specific application, and/or between a specific source end-point to a specific destination end-point. By intercepting and filtering network traffic at or closer to the client avoids unnecessary network traffic being processed by the appliance and the appliance having to apply policies to protect the network. This provides additional security to the network protected by the appliance as the client agent does not transmit undesired network traffic to the appliance. Furthermore, the appliance provides finer grain control of authentication, authorization and auditing policies on a per application basis, and even on a per request basis for each application.

What is claimed:

1. A system comprising:
 a device having one or more processors, that is intermediary to a first network and a second network, the device configured to allow or deny a level of access by an application via the first network to a resource on the second network;
 wherein the device is configured to receive an identifier of the application from an agent on the client, the identifier of the application transmitted to the device responsive to a determination that a routing table of the client provided by the device includes the identifier of the application; and
 wherein the device is configured to identify a policy based on the identifier of the application, receive a request from the client on the first network to access by the application the resource on the second network, and determine based on the policy to one of allow or deny access by the application to the resource on the second network.

2. The system of claim 1, wherein the device is further configured to establish a virtual private network connection with the client on the first network.

3. The system of claim 1, wherein the agent is configured to determine that the routing tables includes the identifier of the application.

4. The system of claim 1, wherein the agent is configured to intercept communications from the client based on the identifier of the application being in the routing table.

5. The system of claim 1, wherein the agent is configured to intercept a request to connect to a server on the second network and identify the identifier of the application from the request.

6. The system of claim 1, wherein the device is further configured to transmit the routing table to the client.

7. The system of claim 1, wherein at least a portion of the application executes on a second device of the second network.

8. The system of claim 1, wherein the identifier of the application comprises one or more of the following: a destination network identifier, a destination port, a protocol, a source network identifier, a source port, and an intranet application name.

9. The system of claim 1, wherein the identifier of the application comprises one of the following: a name of the application on the client or a process identifier of the application on the client.

10. The system of claim 1, wherein the policy specifies the identifier of the application and an authorization of one of access or deny.

11. A system comprising:
 an agent executing on a processor of a client on a first network in communication with a device that is intermediary to the client and a server of a second network;
 an application routing table of the client provided by the device and comprising identifiers of applications allowed access to the second network via the device;
 an agent of the client configured to determine an identifier of an application via a request from the client to access a resource on the second network is in the application routing table and to transmit the identifier of the application to the device responsive to the determination; and
 wherein the agent is configured to receive from the device a communication indicating that a request to access by the application the resource on the second network is one of allowed or denied responsive to the agent transmitting the identifier of the application and the device identifying a policy to apply to the request based on the identifier of the application.

12. The system of claim 11, wherein the agent is further configured to establish a virtual private network connection with the device.

13. The system of claim 11, wherein the agent is further configured to use the application routing table to determine which communications of the client to intercept and transmit to the device.

14. The system of claim 11, wherein the agent is further configured to receive the application routing table from the device.

15. The system of claim 11, wherein the identifiers of applications in the application routing tables comprise one or more of the following: a destination network identifier, a destination port, a protocol, a source network identifier, a source port, and an intranet application name.

16. The system of claim 11, wherein the identifiers of applications in the application routing tables comprise one of the following: a name of the application on the client or a process identifier of the application on the client.

17. The system of claim 11, wherein the agent is further configured to intercept a request to connect to a server on the second network and identify the identifier of the application from the request.

18. The system of claim 11, wherein the application executes on one of the client or the server.

19. The system of claim 11, wherein the agent is further configured to intercept the request to access by the application the resource on the second network and transmit the request to the device.

20. The system of claim 11, wherein the agent is further configured to determine the identifier of the application from one of a name or a process identifier of the application executing on the client.

* * * * *